United States Patent
Gleave et al.

(10) Patent No.: US 11,783,295 B2
(45) Date of Patent: Oct. 10, 2023

(54) SYSTEM AND METHOD FOR TRACKING PROJECT TASKS IN REAL TIME

(71) Applicant: F3Systems Limited, London (GB)

(72) Inventors: Gavin Gleave, London (GB); James Keyworth, London (GB); Kyle Nash, London (GB); Lewis Gleave, London (GB)

(73) Assignee: Fu3e Limited, West Sussex (GB)

( * ) Notice: Subject to any disclaimer, the term of this patent is extended or adjusted under 35 U.S.C. 154(b) by 0 days.

(21) Appl. No.: 17/230,629

(22) Filed: Apr. 14, 2021

(65) Prior Publication Data

US 2022/0318754 A1 Oct. 6, 2022

Related U.S. Application Data

(60) Provisional application No. 63/168,761, filed on Mar. 31, 2021.

(51) Int. Cl.
*G06Q 10/10* (2023.01)
*G06Q 10/0631* (2023.01)

(52) U.S. Cl.
CPC ..... *G06Q 10/103* (2013.01); *G06Q 10/06313* (2013.01)

(58) Field of Classification Search
CPC .............. G06Q 10/103; G06Q 10/105; G06Q 10/0633; G06Q 10/00; G06Q 10/06; G06Q 30/02; G06F 16/2379; G06F 16/252; H04L 63/08; H04L 12/1813; H04L 51/04; H04L 51/34
See application file for complete search history.

(56) References Cited

U.S. PATENT DOCUMENTS

| | | | |
|---|---|---|---|
| 10,545,951 B1* | 1/2020 | Lieberman | G06F 16/211 |
| 2007/0245300 A1* | 10/2007 | Chan | G06Q 10/06 717/105 |
| 2008/0065448 A1* | 3/2008 | Hull | G06Q 10/06 705/7.26 |
| 2011/0071869 A1* | 3/2011 | O'Brien | G06Q 10/103 705/7.12 |
| 2012/0110087 A1* | 5/2012 | Culver | G06Q 10/103 709/205 |
| 2013/0205224 A1* | 8/2013 | Grundvig | G06Q 10/103 715/751 |
| 2014/0019187 A1* | 1/2014 | Olsen | G06Q 50/01 705/7.23 |
| 2014/0337071 A1* | 11/2014 | Stiffler | G06F 3/04847 705/7.13 |
| 2016/0162819 A1* | 6/2016 | Hakman | G06Q 10/0633 705/7.27 |
| 2017/0169383 A1* | 6/2017 | Schmidt | G06Q 10/063114 |
| 2018/0053328 A1* | 2/2018 | Simonovic | G06T 11/206 |
| 2020/0293712 A1* | 9/2020 | Potts | G16H 10/60 |

OTHER PUBLICATIONS

Chen et al., A Workflow-based Cooperative Project Management System, Oct. 1, 2011, 2011 10th International Symposium on Distributed Computing and Applications to Business, Engineering and Science, pp. 69-73 (Year: 2011).*

* cited by examiner

*Primary Examiner* — Robert D Rines
(74) *Attorney, Agent, or Firm* — Ted Sabety; Sabety +associates PLLC

(57) ABSTRACT

A computer system and process for defining and operating a data structure that defines task forms and workflows associated with those forms is described that may be used for project management.

24 Claims, 9 Drawing Sheets

[F3] Forms                                                                    F3GROUP Projects ▼    Super Admin ◯

Forms
Manage    Groups

---

Form Details    Form Builder    List Settings    Assign Projects    Workflow Builder

02 4112 TC/C Purchase Order
Configure the form workflow                                        Show Borders ▼

1. Supplier Information

Supplier Name                Supplier Contact           Contact Name
[        ]                   [        ]                 [        ]
Supplier Email               Type of Supplier
[        ]                   [        ]

2. Order Details

Order Description
Commencement Date            Completion Date            Employer
[        ]                   [        ]                 [        ]
Client Code                  Order Process Msg
[        ]                   [        ]

3. Order Commercial

Order Value                  Payment Type               Payment Terms
[        ]                   [        ]                 [        ]

Fig. 4

SYSTEM AND METHOD FOR TRACKING PROJECT TASKS IN REAL TIME

PRIORITY CLAIM

This is a utility application that claims the benefit of U.S. Prov. Pat. App. No. 63/168,761 filed on Mar. 31, 2021, and hereby incorporates it by references for all that it teaches herein.

FIELD OF INVENTION AND BACKGROUND

This invention relates to computer processes and data structures that define an environment for monitoring tasks that together constitute a project. In one example application, the project may be the construction of a building. To construct a building, many tasks must be completed. Furthermore, some tasks are dependent on external inputs while other tasks are dependent on the output of earlier tasks. In the former case, there may be a task that calls for a government inspection of a building foundation before wall framing is erected. In the latter case, a task of hiring a team of construction workers may depend on the timing of completion of the inspection task. The inter connection of these task processes can quickly become highly complex, and even more so if there is more than one project. Yet some of these tasks may be specific to the project. For example, a building next to a mass transit location may have additional tasks that a house built in the country does not. For this reason, there is a need for a system that can define projects, define tasks and define their interdependencies on a customized basis and track the progress of the tasks in order to evaluate the progress of the project.

SUMMARY

The invention includes a set of data structures that define attributes of a project and its sub-components, which comprise tasks and further, various users related to those tasks. The inter-relation of tasks may be defined by a workflow. The workflow may be defined by a form, which lists attributes of the workflow, including specifying sub-tasks, related tasks and dependencies. Once the set of workflows has been defined, an instance of the form may be created, referred to as a ticket, and a specific instance of the task specified. The tickets are stored in a database. As a new task in the project is initiated, a ticket instance of the form representing the task is populated with specific information about that task. The ticket is stored in a database. The status of the project can be determined by querying the database to obtain the status of the tickets. The status of the tickets may determined by analyzing the graph of interconnection of the tickets, where the graph is defined by the workflows specified in the form, where each arc of the graph is defined by the specified task dependencies specified in the corresponding form. The system can access tasks by querying the database. The sequence tasks to query may be determined by following the task dependencies defined in the tickets. By analyzing the conditions of the tasks and their dependencies, the system can determine which tasks may be impeding the completion of the project at a particular point in time. In addition, the system can use the project data structure and its components to locate critical dependencies that call for redefining the workflow in order to alleviate problems. The system can then accept changes to a workflow, and propagate the revisions as revisions to the data structures that define the tasks, and therefore the instances of a ticket and other constituent data structures comprising the project.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 101 is first introduced and discussed with respect to FIG. 1).

FIG. 4: Depicts an Exemplary Admin Form Builder

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

The system embodying the invention is comprised of data structures that define its components. For example, a data structure representing a form is defined by the computer in a representative database schema. The database schema defines the data structure for the other elements of the project as well. In one embodiment, a project can be specified by an identifier, plus other attributes specific to the overall project. In the example of a construction project, the project data structure (FIG. 5A) is comprised of an identifier data value and other data values that may include an address, a building permit number, a latitude and longitude, a GPS coordinate and the like. The project ID is used to relate the general project data structure to its related data structures.

Figure 5A:
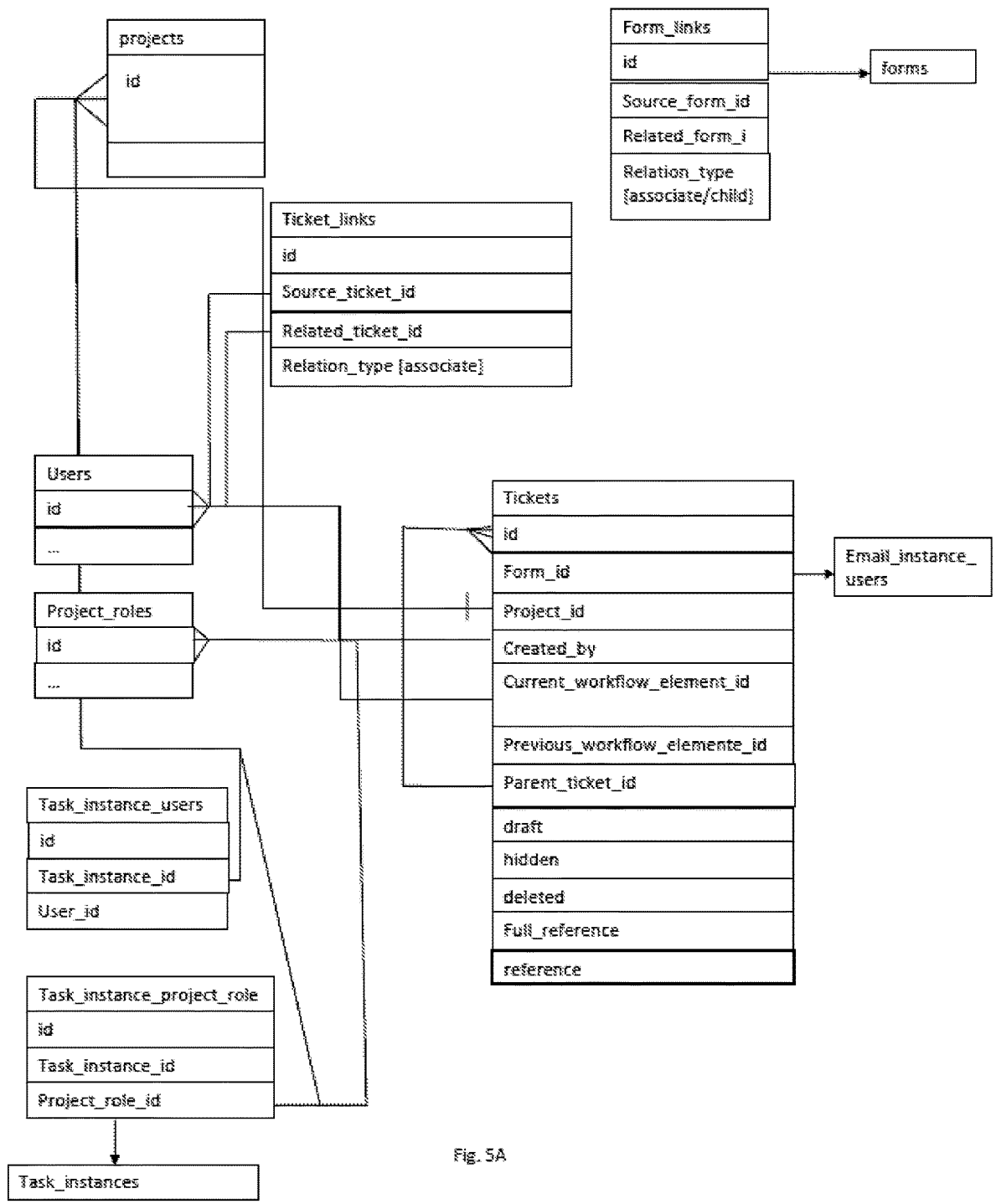
FIG. 5A to 5E: Exemplary ticket and workflow database schema
Figure 5B:
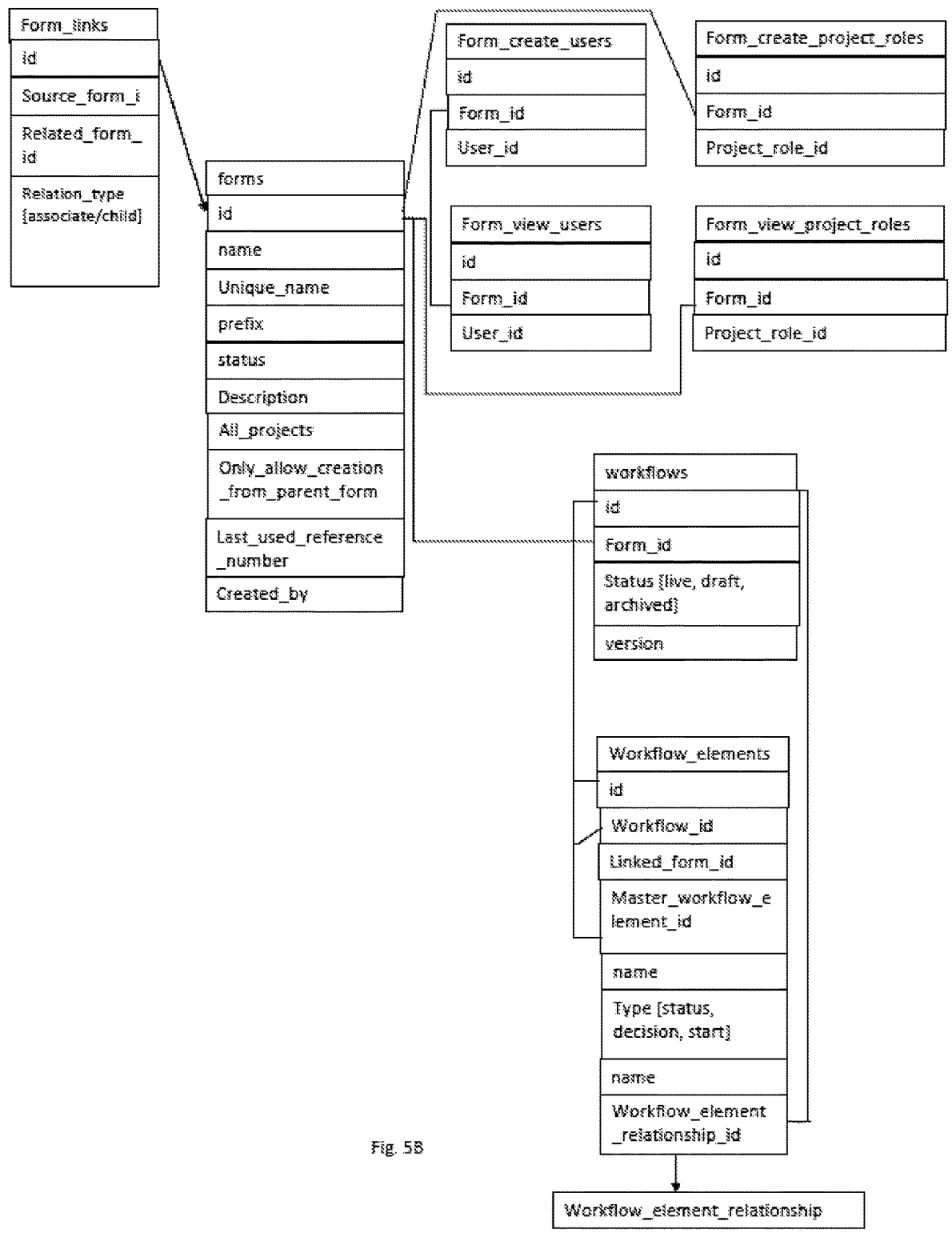

The project may utilize defined forms. (FIG. 5B) The form has a name, a description and other attributes. The FormID is used to relate other data structures to the form. For example, the roles of various persons can be defined for each form (FIG. 5B). Each person is represented by a data structure that includes at least one Form ID they are active with, and a ProjectRoleID that specifies their role with regard to that FormID. A form can be linked to different forms via the form_links table which allows the tickets to link to the related forms at any stage of the workflow. There is also a linked_form_id on the workflow elements table which means that the child form must be created at the specific status.

Further, the FormID can link a form to a workflow data structure (FIG. 5B). Workflows contain many "elements", where each element behaves differently depending on the type of element. In one embodiment, there are three types of elements. A start element is the starting point of the workflow such that a ticket will always start on this Element. A status element is a stage where a ticket can assigned a status, for example. "Pending Authorization." Statuses contain edit field permissions, required fields, a task, an email and/or a form link. A decision element gives the user a choice on which status to move the ticket to, for example the user may be given a choice of moving the ticket to the "Pending Authorization" status or to move it to "Rejected" status.

Figure 5C:
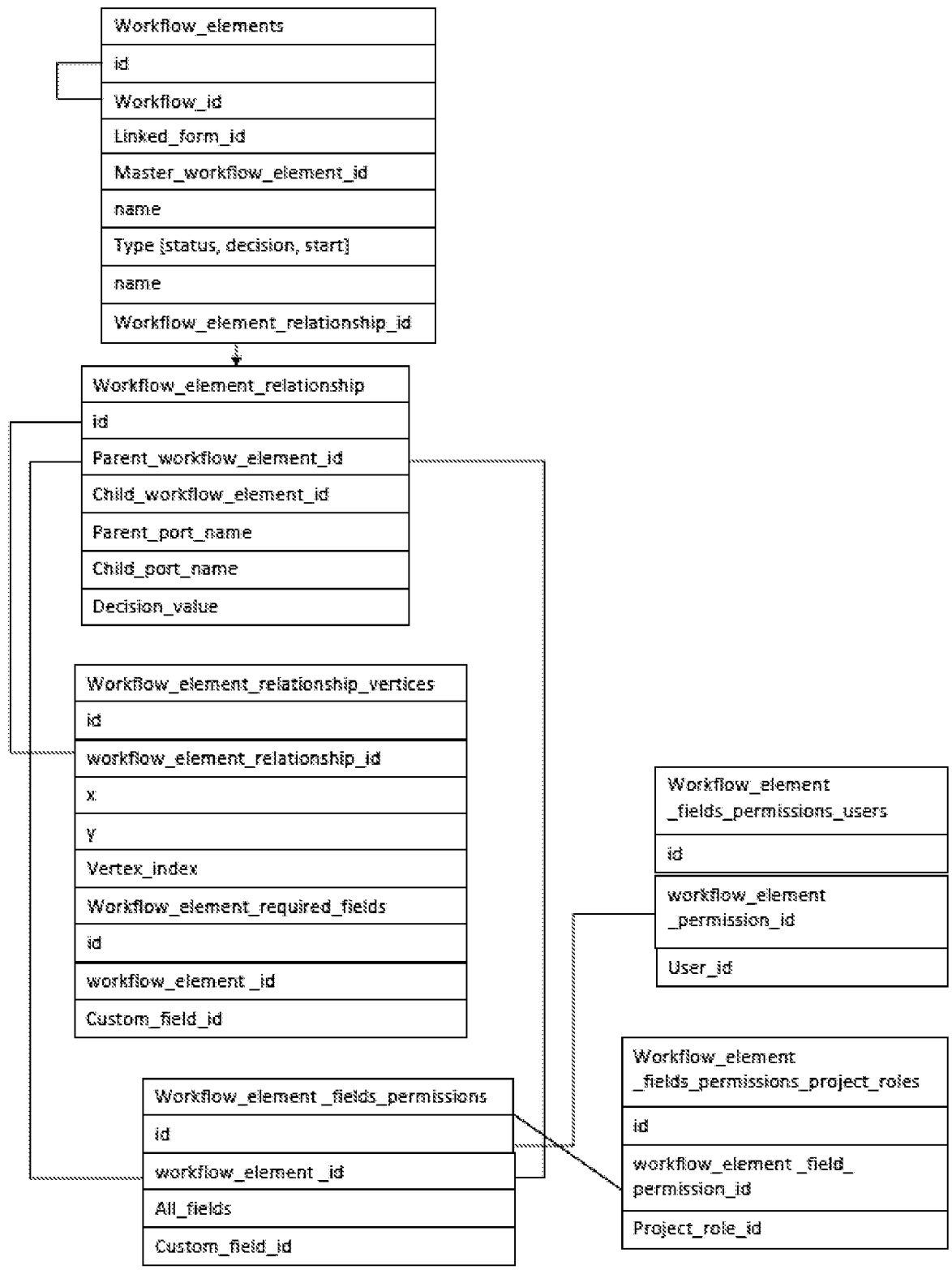

The workflow data structure has a WorkflowID that links it to its constituent WorkflowElements (FIG. 5B). That element may includes a specification of its Type and other attributes. Elements are linked in the workflow via the "workflow_element_relationships" table. Required fields are set within the workflow_element_required fields, this means the fields must contain information before moving the ticket onto the next status. In addition, a WorkflowElement data structure is comprised of a workflow element Relationship identifier that specifies the workflow relationships for that workflow element. (FIG. 5C). The workflow element relationship can define a hierarchy of workflow elements by specifying a parent workflow element or a child workflow element and other attributes, comprised of a decision_value corresponding to that workflow element.

The decision value can represent conditions being met or the task represented by the element in the workflow being satisfied. For example, an element might be inspection of incoming materials for compliance with building codes. However, not all users may have permission to make these changes in the workflow. Authority is given at 2 levels, at the form level which gives the user permission to create or view the ticket and also at workflow level where the user is given permissions to edit specific fields on each status. The decision value may be null until a user whose role as specified in the data structure, inputs data into the system indicating a successful inspection, in which case, the decision value is changed to True. Alternatively, the decision value may be set to False, indicating that the inspection failed. For each workflow element data structure, it can also have permission values associated with users. (FIG. 5C). Each permission value can be represented in a data structure that refers to users and project roles that have that permission. (FIG. 5C). Field permissions are set within "workflow_element_field_permissions" table, this allows certain fields to be editable to specific users or roles when a workflow is at a specific status.

A task is the definition of the task on a workflow, this also contains the users and project roles that can be assigned the task and what the deadline is on that task. A task instance is an instance of the task that the users or project roles must action. By actioning a task, the user will be responsible for selecting the next status of the workflow if there is a decision. If there isn't a decision and then the ticket will simply move onto the next status or state condition in the workflow. An email is the definition of the email, this includes the content of the email and also the possible recipients of the email. An email instance is an instance of that email being sent out. An email is only sent out once a ticket reaches the workflow status that contains the email task.

Figure 5D:
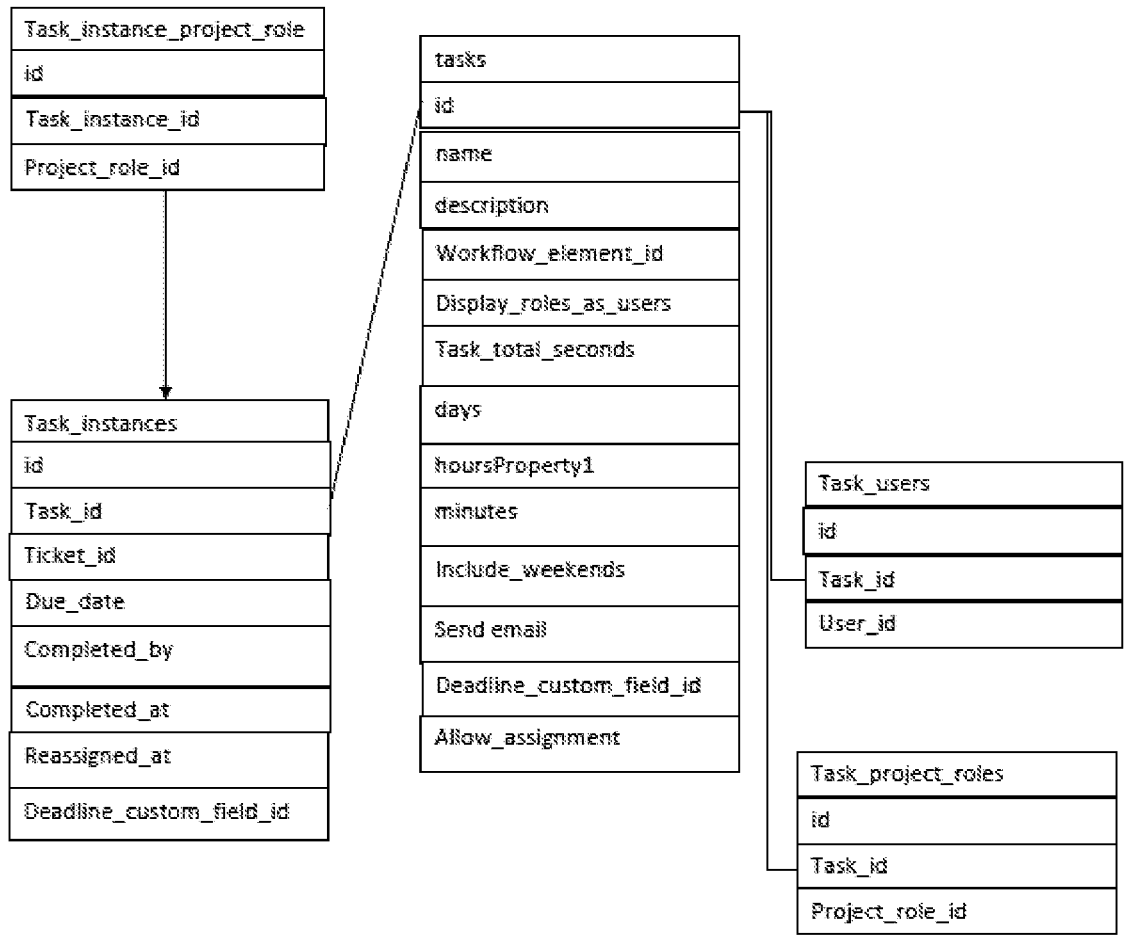

A task is defined by a task instance. (FIG. 5D) Each task has an identifier, but also the ticket ID for an instance of the task. This accomplishes distinguishing between data structure relationships for a task definition, and a specific instance of a task in a specific project. The task instance includes attributes that include due dates, sign off, completion dates. The taskID can be used to refer to additional tasks. (FIG. 5D). An instance of a task is comprised of its corresponding Workflow Element ID. (FIG. 5D) as well as other attributes specific to the task. In one embodiment a task can define a completion action of sending an email to a location defined in the data structure indicating completion of the task (FIG. 5D). Further, the tasks data structure can be linked by its identifier to Task User and Task Project Role data structures that specify users and their roles in the task. (FIG. 5D). A ticket is a submission of a form that can only be on a single workflow version and this cannot be changed. The authority to create and view tickets is defined within the "form_view_users", "form_view_project_roles", "form_create_users" & "form_create_project_roles" tables.

Figure 5E:
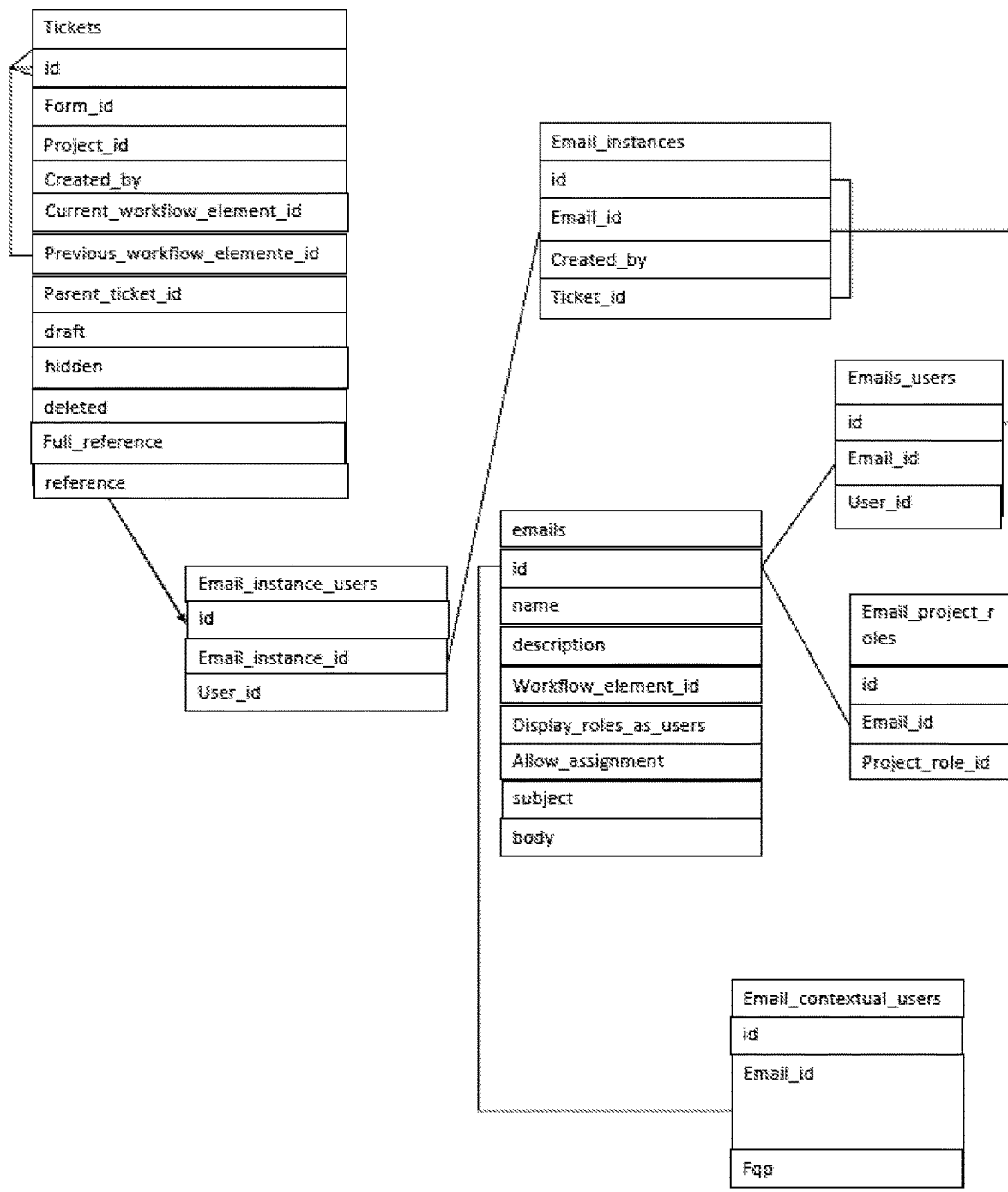

The system can be used to automate electronic communication of task status. Electronic communication of status may be accomplished by transmitting data messages in various forms, including text messaging, automated telephone calls, emails, Slack™ messages, Teams™ messages and other kinds of electronic communication platforms. In one embodiment, the data messages are distributed by email. With email communication as a non-limiting example, the automatic email of a task result or other action can be further defined by the ticket data structure (FIG. 5A), (FIG. 5E). Each electronic communication may be represented by a data structure. (FIG. 5E). That message may include a workflow element ID that it is related to as well as the specific information that is the message. (FIG. 5E). The same data structure may be generalized as a message data structure, where an additional attribute indicates the type of messaging medium.

The user of the system may create an instance of a form by using a user interface that presents a form builder (FIG. 4). This process displays on a computer screen a form design, where the user specifies the features of the form. This may be accomplished by presenting a menu of items that are drag-and-dropped into the display of the form. In the example presented it is a form named "Purchase Order". Its attributes include a "Supplier Name" and other information about the supplier. Other aspects of the order, including the materials, quantities and terms and conditions are also data components that will be presented by the form, and populated in an instance of the data structure for an instance of a purchase order, in this example "Order Details" and "Order Commercial" for the commercial terms. A specific ticket is thereby created. For example, a ticket data structure is comprised of its own ticketID but also the projectID it is part of (FIG. 5A), the formID that it is an instance of and its workflow dependencies (FIG. 5A). These may include an identifier for the current workflow element that the ticket represents and its previous workflow element that it depends on. (FIG. 5A).

An instance of the form is used by the system to store the state of its corresponding task. The system can display an instance of a form to present to the user the current status of the form. The current status of the form can also be tracked for each instance by a state variable data element that comprises the form. This state variable represents the current location node in the workflow graph that the form occupies. For example, the Purchase Order is displayed with an indication that "14 days overdue", because the location of that instance of the form is at the waiting for delivery state. This information may be extracted from the graph data structure constituting the workflow.

Each form (FIG. 4) must have a valid workflow for the form to be visible to the end-user. In order for a workflow to be valid, it must have at least one status connected to the workflow start element.

Figure 2:
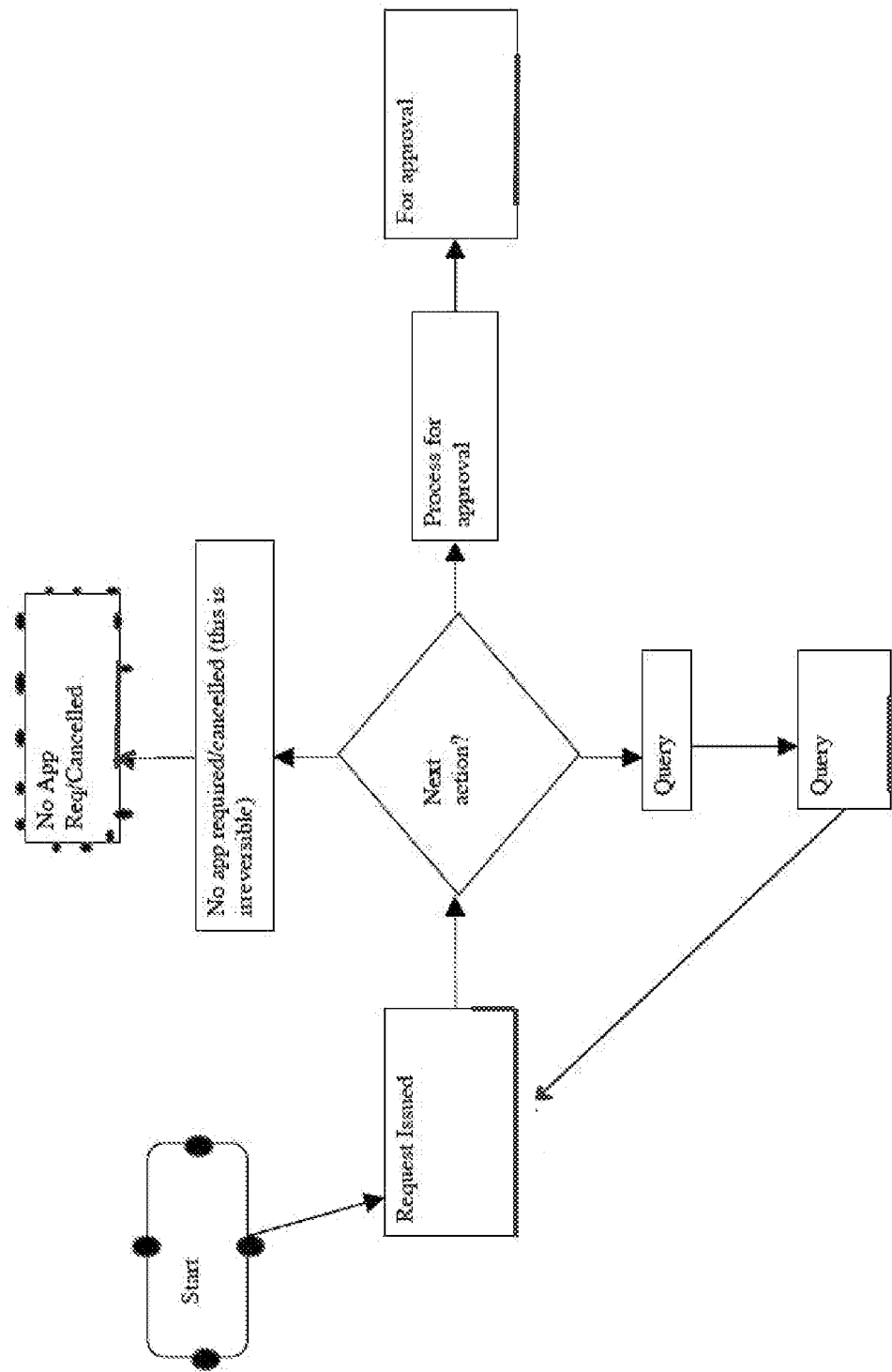
FIG. 2: Exemplary Workflow Form Link

When the form is created its "workflow dependencies" may be defined in a drag and drop menu and designed in a graphical user interface where the user can drag and drop graphical elements representing the constituent steps to the workflow and to specify by graphic arcs, the dependencies between these elements. FIG. 2. The form can be inspected to automatically create a graph of the workflow for the form and the forms within a project, hence the workflow for the project. Part of that has different user authorities relevant for different parts of the form workflow. In a preferred embodiment, a drag & drop user interface allows the admin user to connect status and decision elements onto the workflow canvas to create the form workflow.

Figure 3:
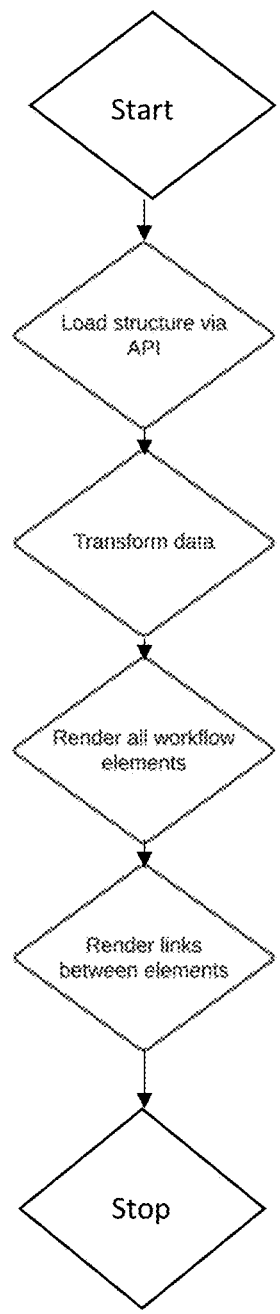
FIG. 3: Exemplary Workflow Canvas Diagram

As exemplified in FIG. 3, a workflow is displayed in several steps. First the system loads the data structure representing the workflow from an API endpoint. Second, the data is transformed, separating the start element, statuses and decision elements into corresponding graphical objects. Third, the system renders as a graphic on the user interface the start element, then the statuses and finally the decisions. Each element is placed on the workflow builder user interface in an x, y location, where the values are data elements of the instance of the data structure defining the workflow element. The user may move the graphic representing the element and the X, Y value of the data structure is updated thereby to match the revised X,Y location. In addition, the last step renders the relationships of the statuses, which is how the workflow elements related to each other.

Once a workflow has been completely designed, all subsequent tickets created under that form will adhere to that version of the workflow A form can have multiple workflow versions associated to it, as explained in further embodiments below. An administrator can create and update forms within an environment. Instances of the form (termed a ticket) can then be created by the end user within the context of a project. Once an admin has built the data structure and layout of the form, they must assign the form a valid workflow version. The workflow version dictates the available statuses, permissions, workflow routes and related forms.

Workflow Relationships

The form and workflow builder enables administrators to create and update workflow relationships between associated processes. This helps to ensure that project teams collate and link the required data points throughout a predefined process.

Relationship Types

The elements of a workflow for a form can be defined by relationship types. Table 1 is an example of relationships in one embodiment.

TABLE 1

Figure 1:
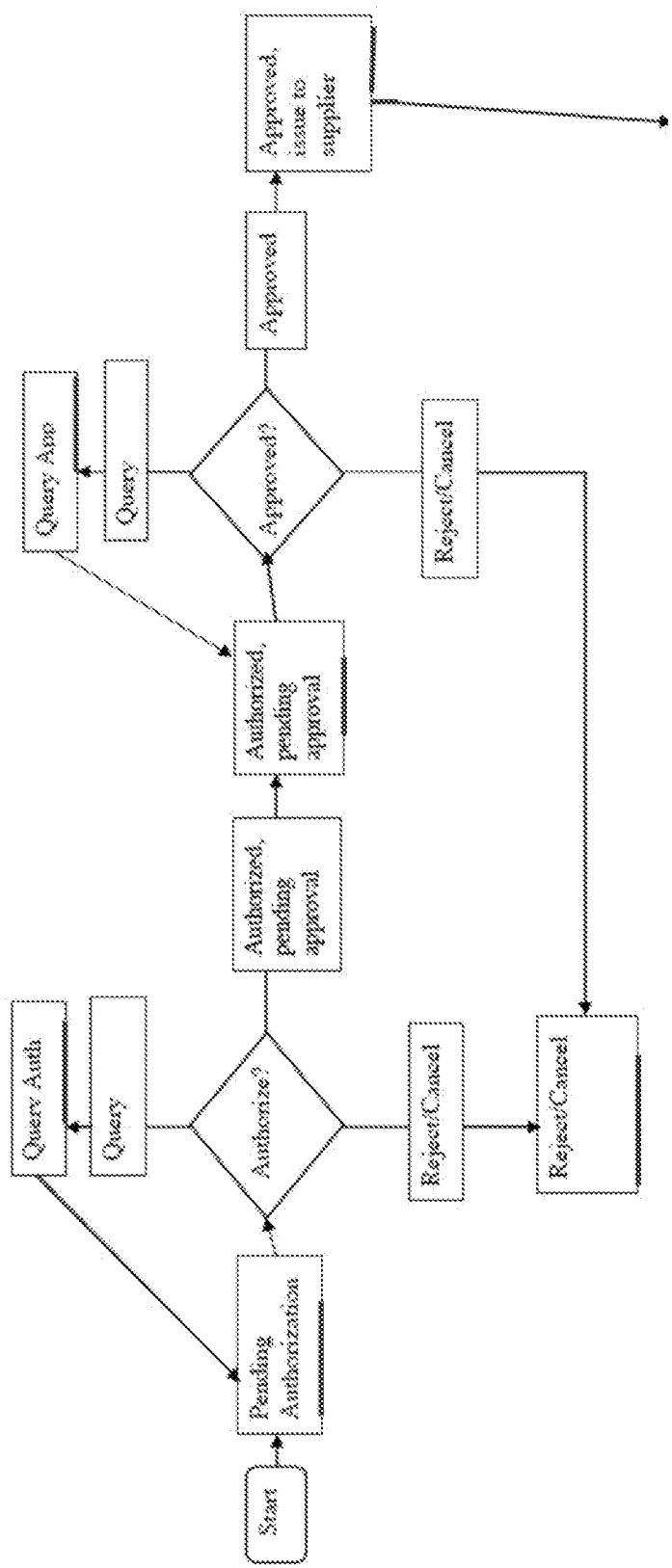
FIG. 1: Exemplary Workflow—Purchase Order

| Type | Description | Example |
| --- | --- | --- |
| Parent | A parent is a form that precedes a child form. | A purchase order form (FIG. 1) is a parent for an invoice form |
| Child | A child is a form that succeeds a parent form. | A meeting action form is a child of a meeting minutes form. |

TABLE 1-continued

| Type | Description | Example |
| --- | --- | --- |
| Associate | An associate form can be linked to any other associate. The order of creation is not restricted. | A project report form can be associated to a meeting minutes form. |

Form Link Types

In another embodiment, there are different types of form links that have different workflow constraints associated with them. In order to progress to the 'For Approval' stage of the below workflow, the user must create an associated child ticket. These are depicted in Table 2.

TABLE 2

| Type | Types | Description |
| --- | --- | --- |
| Workflow form link | Parent or child | A workflow form link is constrained to a particular workflow version of a form. In order to progress the parent instance through its workflow, you must create a child instance of the linked child form. See example below. |
| Form link | Parent, child or associate | A form link can be created at any point during the item's workflow. The creation of a child or associate is not constrained by the workflow. |

Form Links & Scripting Language

When a form is linked to another form this creates a relationship between the two objects. This relationship can then be defined by using a computer language. In one embodiment, the form builder accepts as input the selection of functions in a scripting language in order that the script defining the relationship is part of the form. By way of example and not limitation, to calculate all approved child invoices associated with the current purchase order, one could create the below formula as an admin when composing the form:

SUM(ticket.child:invoices, 'invoice_value', {!Item.approved=1})

When the end user views the current state of a form, for example the purchase order, the system would execute the script comprising that purchase order form. As a result, the value calculated as a result of the executing the script would be shown the calculated figure for all approved invoices, that were created as a child of the currently selected purchase order instance.

Other scenarios where a workflow relationship type can be referenced within a scripting formula include:

ticket.parent:purchase_order ticket.associate:project report

Multi-Level Form Links

By creating many parent and child relationships, one can create a multi-form process. An example of this can be seen below:

| Label | Form | Description |
| --- | --- | --- |
| Grandparent | Supplier Request | Request for a new supplier to be added to the system. |

-continued

| Label | Form | Description |
| --- | --- | --- |
| Parent | Supplier Approval | Approval of requested supplier. |
| Child | Purchase Order | Place order with an approved supplier. |
| Grandchild | Invoice | Track invoices related to the supply order. |

Multi-Level Form Links & Scripting Language

To reference a grandparent form, that was further up the multi-form link chain, the following script can be defined within a form:

ticket.parent:purchase_order.parent:supplier_approval,
'supplier_name'

By using the workflow form links, it becomes possible to reference distantly related forms data structure, that are linked to the immediate parent or child.

Validation Rules, Workflow & Scripting Language

By combining a forms workflow, script formulae and validation rules, an admin user can enforce rules to restrict when an end user can move a ticket through a stage of a workflow. This is the process that update the entire project data structure as the myriad tasks are commenced and worked through to completion. When a user receives a message that ticket is waiting an action from them, in their designated role as a designated user of the form, then the user can access the system to view the ticket. If the user's role is to make a decision about the ticket, they can input their response. This may be a decision value that gets saved in the instance of the form data structure for that ticket. At that point, the system can process the update by acting with the scripting language to move the ticket to its next tasks. By "move" it is meant an analogy in that the logic of the script associated with that form may dictate that upon the decision value resulting from the user input and the defined workflow, the next task in the workflow is activated and that the state condition of the instance of the form data structure or ticket has changed to a new state.

The admin user must first create a script formula for workflow elements that generates a data value that can be acted upon by the script code logic. In one embodiment it is a Boolean return type. This formula can then be connected to a validation rule, which may be displayed to the user as the Boolean value TRUE or FALSE. On displaying the validation message, the user is restricted from saving or updating the ticket to the next stage of the forms workflow unless the validation test calculated by the verification script formula returns "TRUE".

Example Boolean Formula

AND(ticket.order_value>100,000, ISBLANK(ticket.
approver), ticket.status='Awaiting Approval')

When all of the following criteria are met, the validation message will display indicating that the task is not complete:
   Order value is greater than £100,000
   The user has not specified an approver
   The ticket is awaiting approval In addition, the data structure state can be analyzed to determine that the project of which this task is a constituent, is dependent on this specific task getting completed.

This particular script may also trigger the workflow element of transmitting the form or a message indicating that the form requires review to a designated person in the form that is to review it. At the same time, the script may also store the current date and time in the form data structure in order that a time delay can be determined. As the many tasks get completed, the collection of form data structures are updated. In one embodiment, the form can be considered to occupy a state that is represented by a location in the graph that represents the workflow. As the workflow elements are executed, that location moves through the workflow graph. As that movement of the logical state occurs, the data elements comprising the form are updated. In some cases, the movement stops due to some kind of delay. For example, a purchase order form may arrive at a location in the workflow where the purchase order is transmitted out to the supplier. FIG. 4. A time value may be stored in the form data structure to indicate when that happened. At a later time, if that order has not been delivered, (which may be detected by the ticket being in the state of waiting for delivery) an interval of time may be calculated by the system between the current time and the time value stored in that form. If the system determines that the interval of time is greater than some threshold, then an alert message can be automatically transmitted to one of the designated users of the form, or even a designated user of a parent of the form.

In another embodiment, this logic can also be built into the workflow definition with the scripting language. The system would periodically cycle through all of the forms to update any time interval values that are stored in the forms and to test those time intervals. In an alternative embodiment, the system can run a process that inspects the entire project data structure, traversing the entire hierarchy of form data structures that are linked together into one project, inspecting each for instances of forms where the last time entry is more than some predetermined time interval in the past. Traversing the project data structure and its constituent forms entails traversing the graph defined by the tickets as nodes and their links and dependencies defined in the data structure as edges. As the system selects a sequence of tickets as it executes the traversing algorithm, it can inspect the data elements that are called for by the query, in this example, the amount of time since the ticket entered the state of waiting on the delivery. That result can be added to a cumulative value that is then divided by the number of tickets in that state in order to calculate an average, Alternatively, the cumulative value can be updated if the current time interval is greater than the current cumulative value or ignored as less. This provides a mechanism to determine which ticket is subject to the longest delay time. That form can then be flagged with a data value that represents a level of urgency or that the form and its tasks have run into a problem.

In yet another embodiment, the system can conduct the inspection looking for other conditions in the form. For example, the inspection process may tally up the number of forms that are in a state of waiting on approval. In that case, the designated user associated with that approval is tracked so that for all users in the project with an approval role, the number of forms awaiting approval may be correlated with which users-thereby showing that a particular user may be behind schedule on approvals or that there is a need to increase personnel at that place in the project organization. Similarly, tallies of wait times may be tracked with a corresponding supplier to a project so that it can be determined which suppliers are causing delays in completion of the project and which are swift in completing their deliveries. Further, execution of tasks can be tracked, keeping a tally of tasks, completion time intervals and the corresponding personnel in order to determine relative performance of tasks, or where a task needs more manpower to complete.

Finally, it can traverse the form data structure to follow how funds are approved and used by constituent workflow elements.

In summary, the inspection process can be used to automatically determine using logic and arithmetic a condition state data element for a project, or for several projects. In one example, the project state could be the most delayed task in the project and what the delay time is. It would return a string or pointer to the task, and the data value representing the delay. It could be the most expensive task. It would return a pointer to the most expensive task. It could be the identity of the supplier that takes the longest to deliver. It would return a string value or pointer to the supplier or task where the supplier was used. Conversely, it could determine the average cost of a type of task across a project or more than one project. In this case, the state value would be a pointer to a form that represents the type of task, and a data value representing a cost value for that type of task in that project.

Example JSON Data Structure Formalism:

The visual diagrams of the constituent data structures of FIGS. 6A-E may be expressed in a computer language or other code formality. In one embodiment the JSON formalism may be used. For example, a text file of a JSON type may contain the following items that define the data structures set up by the system:

```
{
    "data": {
        "id": 91,
        "status": "live",
        "version": 2,
        "deleted_at": null,
        "created_at": "2020-10-29T16:15:12.000000Z",
        "updated_at": "2020-10-29T16:15:12.000000Z",
        "form_id": 55,
        "workflow_elements": [
            {
                "id": 571,
                "workflow_id": 91,
                "linked_form_id": null,
                "name": "Start of workflow",
                "type": "start",
                "color": null,
                "x": 40,
                "y": 220,
                "deleted_at": null,
                "created_at": "2020-10-29T16:15:12.000000Z",
                "updated_at": "2020-10-29T16:15:12.000000Z",
                "relationships": [
                    {
                        "id": 616,
                        "parent_workflow_element_id": 571,
                        "child_workflow_element_id": 572,
                        "parent_port_name": "2",
                        "child_port_name": "15",
                        "decision_value": null,
                        "vertices": [ ]
                    }
                ],
                "task": null,
                "emails": [ ]
            },
            {
                "id": 572,
                "workflow_id": 91,
                "linked_form_id": null,
                "name": "Awaiting Approval",
                "type": "status",
                "color": "#FFB666",
                "x": 240,
                "y": 200,
                "deleted_at": null,
                "created_at": "2020-10-29T16:15:38.000000Z",
                "updated_at": "2020-10-29T16:15:38.000000Z",
                "relationships": [
                    {
                        "id": 620,
                        "parent_workflow_element_id": 572,
                        "child_workflow_element_id": 573,
                        "parent_port_name": "7",
                        "child_port_name": "4",
                        "decision_value": null,
                        "vertices": [ ]
                    }
                ],
                "task": {
                    "id": 236,
                    "workflow_element_id": 572,
                    "deadline_custom_field_id": null,
                    "name": "Approve Ticket",
```

-continued

```
            "description": "Assign to the person responsible for appr(
            "display_roles_as_users": false,
            "task_total_seconds": null,
            "days": 3,
            "hours": 0,
            "minutes": 0,
            "include_weekends": false,
            "send_email": true,
            "allow_assignment": true,
            "created_at": "2020-11-15T20:20:00.000000Z",
            "updated_at": "2020-11-15T20:20:00.000000Z",
            "deleted_at": null
        },
        "emails": [ ]
    },
    {
        "id": 573,
        "workflow_id": 91,
        "linked_form_id": null,
        "name": "Approve?",
        "type": "decision",
        "color": null,
        "x": 480,
        "y": 180,
        "deleted_at": null,
        "created_at": "2020-10-29T16:16:04.000000Z",
        "updated_at": "2020-10-29T16:16:04.000000Z",
        "relationships": [
            {
                "id": 617,
                "parent_workflow_element_id": 573,
                "child_workflow_element_id": 574,
                "parent_port_name": "3",
                "child_port_name": "15",
                "decision_value": "Approved",
                "vertices": [ ]
            },
            {
                "id": 618,
                "parent_workflow_element_id": 573,
                "child_workflow_element_id": 575,
                "parent_port_name": "1",
                "child_port_name": "13",
                "decision_value": "Query",
                "vertices": [ ]
            },
            {
                "id": 619,
                "parent_workflow_element_id": 573,
                "child_workflow_element_id": 576,
                "parent_port_name": "2",
                "child_port_name": "4",
                "decision_value": "Rejected",
                "vertices": [ ]
            }
        ],
        "task": null,
        "emails": [ ]
    },
    {
        "id": 574,
        "workflow_id": 91,
        "linked_form_id": null,
        "name": "Approved",
        "type": "status",
        "color": "#8DBF68",
        "x": 740,
        "y": 200,
        "deleted_at": null,
        "created_at": "2020-10-29T16:16:20.000000Z",
        "updated_at": "2020-10-29T16:16:20.000000Z",
        "relationships": [ ],
        "task": null,
        "emails": [ ]
    },
    {
        "id": 575,
        "workflow_id": 91,
        "linked_form_id": null,
```

```
            "name": "Query",
            "type": "status",
            "color": "#FFB666",
            "x": 440,
            "y": 20,
            "deleted_at": null,
            "created_at": "2020-10-29T16:16:44.000000Z",
            "updated_at": "2020-10-29T16:16:44.000000Z",
            "relationships": [
                {
                    "id": 621,
                    "parent_workflow_element_id": 575,
                    "child_workflow_element_id": 572,
                    "parent_port_name": "15",
                    "child_port_name": "4",
                    "decision_value": null,
                    "vertices": [
                        {
                            "id": 145,
                            "workflow_element_relationship_id": 621,
                            "x": 342,
                            "y": 60,
                            "vertex_index": 1
                        }
                    ]
                }
            ],
            "task": {
                "id": 237,
                "workflow_element_id": 575,
                "deadline_custom_field_id": null,
                "name": "Respond to Query",
                "description": "Assign to the person responsible for responding to your query.",
                "display_roles_as_users": false,
                "task_total_seconds": null,
                "days": 3,
                "hours": 0,
                "minutes": 0,
                "include_weekends": false,
                "send_email": true,
                "allow_assignment": true,
                "created_at": "2020-11-15T20:20:00.000000Z",
                "updated_at": "2020-11-15T20:20:00.000000Z",
                "deleted_at": null
            },
            "emails": [ ]
        },
        {
            "id": 576,
            "workflow_id": 91,
            "linked_form_id": null,
            "name": "Rejected",
            "type": "status",
            "color": "#FF6080",
            "x": 440,
            "y": 380,
            "deleted_at": null,
            "created_at": "2020-10-29T16:28:11.000000Z",
            "updated_at": "2020-10-29T16:28:11.000000Z",
            "relationships": [ ],
            "task": null,
            "emails": [ ]
        }
    ]
}
```

Similarly, the JSON formalism may be used to define the data structures for the entire project, including management, meeting notes, users, roles and workflows:

```
{
  "data": {
    "id": 2,
    "name": "03001 Meeting Minutes",
    "unique_name": "meeting_minutes",
    "description": "Meeting Minutes",
    "status": "Active",
    "prefix": "MM",
    "all_projects": false,
    "only_allow_creation_from_parent_form": false,
    "last_used_reference_number": 1,
    "created_by": 1,
    "form_group_id": 4,
    "created_at": "2020-02-06T16:39:21.000000Z",
    "updated_at": "2020-02-06T16:39:21.000000Z",
    "permissions": {
      "delete": true,
      "create": true,
      "share": true
    },
    "creator": {
      "id": 1,
      "account_id": 1,
      "name": "Super Admin",
      "name_status": "Super Admin",
      "first_name": "Super",
      "last_name": "Admin",
      "username": "superadmin",
      "email": "admin@fu3e.uk",
      "super_admin": true,
      "image_url": null,
      "active": true,
      "account_status": "Active",
      "organisation": {
        "id": 1,
        "name": "Example Organisation",
        "organisation_type_id": 1,
        "active": 1,
        "type": {
          "id": 1,
          "name": "Standard",
          "unique_name": "standard"
        },
        "created_at": "15th Nov 2020"
      },
      "organisation_id": 1,
      "created_at": "2016-01-01T00:00:01.000000Z"
    },
    "view_users": [ ],
    "view_project_roles": [
      {
        "id": 1,
        "name": "00 Development Director",
        "unique_name": "project_executive",
        "edit_project": true,
        "view_all_files": true,
        "add_files": true,
        "edit_files": true,
        "shared_a_file": true,
        "active": true,
        "deleted_at": null,
        "created_at": "2020-11-15T20:19:19.000000Z",
        "updated_at": "2020-11-15T20:19:19.000000Z"
      },
      {
        "id": 2,
        "name": "01 Development Manager",
        "unique_name": "account_executive",
        "edit_project": false,
        "view_all_files": true,
        "add_files": true,
        "edit_files": true,
        "shared_a_file": true,
        "active": true,
        "deleted_at": null,
        "created_at": "2020-11-15T20:19:19.000000Z",
        "updated_at": "2020-11-15T20:19:19.000000Z"
      }
    ],
    "create_users": [ ],
    "create_project_roles": [
      {
        "id": 1,
        "name": "00 Development Director",
        "unique_name": "project_executive",
        "edit_project": true,
        "view_all_files": true,
        "add_files": true,
        "edit_files": true,
        "shared_a_file": true,
        "active": true,
        "deleted_at": null,
        "created_at": "2020-11-15T20:19:19.000000Z",
        "updated_at": "2020-11-15T20:19:19.000000Z"
      },
      {
        "id": 2,
        "name": "01 Development Manager",
        "unique_name": "account_executive",
        "edit_project": false,
        "view_all_files": true,
        "add_files": true,
        "edit_files": true,
        "shared_a_file": true,
        "active": true,
        "deleted_at": null,
        "created_at": "2020-11-15T20:19:19.000000Z",
        "updated_at": "2020-11-15T20:19:19.000000Z"
      }
    ],
    "child_forms": [
      {
        "id": 35,
        "name": "03001i Meeting Actions",
        "unique_name": "03004_meeting_actions",
        "description": "",
        "status": "Active",
        "prefix": "MA",
        "all_projects": false,
        "only_allow_creation_from_parent_form": true,
        "last_used_reference_number": 3,
        "created_by": 9,
        "form_group_id": 4,
        "created_at": "2020-02-14T09:42:56.000000Z",
        "updated_at": "2020-02-14T09:42:56.000000Z"
      }
    ],
    "parent_forms": [ ],
    "associate_forms": [ ],
    "workflows": [
      {
        "id": 2,
        "status": "live",
        "version": 1,
        "deleted_at": null,
        "created_at": "2020-02-06T16:39:21.000000Z",
        "updated_at": "2020-02-06T16:39:21.000000Z",
        "form_id": 2
      }
    ]
  }
}
```

In operation, a user may build a form that is a "purchase order". The workflow for that form may be set up to require that for any value above $100,000 only a specific user class can approve the purchase order and issue it. That is the design of the form for a project. A user on that project who needs to send out a purchase order for that project will bring up the form to create an instance of it. That instance has various attributes filled in, for example, the amount, pricing, product specifications and commercial terms. That instance of the form then automatically propagates through its associated workflow. The system uses the workflow defined for that form and applies the logic rules to the specific data elements comprising the instance of the form representing the ticket. The rules may modify a variable in the ticket that causes further logic to be activated that finally arrives at a decision or a point where additional input is required. As this process follows the workflow, the state variable of the ticket is modified so that the ticket, which is an instance of the form data structure, keeps track of where it is in its corresponding workflow. For example, assuming the instance of the form is for $200,000 of concrete, the script corresponding to the form will then determine that the purchase order has to be routed to the users who are (i) part of the project and (ii) the specific user class. At that point, the status for that instance of the form is set to "FALSE" or "NOT APPROVED". The form is automatically transmitted to the person of authority. That person may input into the system a data value representing approval of the purchase order. In reaction to that input, the system checks that the person submitting that change is of the user class that has authority to change that status value in the workflow. When confirmed, the status value is changed and the form automatically moves to the "issue purchase order" task, which may be defined in the workflow data structure as transmitting an email copy of the form to a specific email address at the supplier that is recited in the instance of the form, that is, the ticket.

Operating Environment:

The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well-known computing systems, environments, and/or configurations that may be suitable for use with the invention include, but are not limited to, personal computers, server computers, handheld computers, laptop or mobile computer or communications devices such as cell phones, smart phones, and PDA's, multiprocessor systems, microprocessor-based systems, set top boxes, programmable consumer electronics, network PCs, minicomputers, mainframe computers, distributed computing environments that include any of the above systems or devices, and the like. Indeed, the terms "computer," "server," and the like may be used interchangeably herein, and may refer to any of the above devices and systems.

The user environment may be housed in the central server or operatively connected to it remotely using a network. In one embodiment, the user's computer is omitted, and instead an equivalent computing functionality is provided that works on a server. In this case, a user would log into the server from another computer over a network and access the system through a user environment, and thereby access the functionality that would in other embodiments, operate on the user's computer. Further, the user may receive from and transmit data to the central server by means of the Internet, whereby the user accesses an account using an Internet web-browser and browser displays an interactive web page operatively connected to the central server. The server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space displayed by the browser have different URL's. That is, the webpage encoding the simulated space can be a unitary data structure, but different URL's reference different locations in the data structure. The user computer can operate a program that receives from a remote server a data file that is passed to a program that interprets the data in the data file and commands the display device to present particular text, images, video, audio and other objects. In some embodiments, the remote server delivers a data file that is comprised of computer code that the browser program interprets, for example, scripts. The program can detect the relative location of the cursor when the mouse button is actuated, and interpret a command to be executed based on location on the indicated relative location on the display when the button was pressed. The data file may be an HTML document, the program a web-browser program and the command a hyper-link that causes the browser to request a new HTML document from another remote data network address location. The HTML can also have references that result in other code modules being called up and executed, for example, Flash or other native code.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In one embodiment, a user's computer can run an application that causes the user's computer to transmit a stream of one or more data packets across a data network to a second computer, referred to here as a server. The server, in turn, may be connected to one or more mass data storage devices where the database is stored. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two respective remote computers to exchange information by means of digital network communication. As a result a data message can be one or more data packets transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In addition, the user's computer may obtain data from the server that is considered a website, that is, a collection of data files that when retrieved by the user's computer and rendered by a program running on the user's computer, displays on the display screen of the user's computer text, images, video and in some cases outputs audio. The access of the website can be by means of a client program running on a local computer that is connected over a computer network accessing a secure or public page on the server using an Internet browser or by means of running a dedicated application that interacts with the server, sometimes referred to as an "app." The data messages may comprise a data file that may be an HTML document (or other hypertext formatted document file), commands sent between the remote computer and the server and a web-browser program or app running on the remote computer that interacts with the data received from the server. The command can be a hyper-link that causes the browser to request a new HTML document from another remote data network address location. The HTML can also have references that result in other code modules being called up and executed, for example, Flash, scripts or other code. The HTML file may also have code embedded in the file that is executed by the client program as an interpreter, in one embodiment, Javascript. As a result a data message can be a data packet transmitted from or received by a computer containing a destination network address, a destination process or application identifier, and data values or program code that can be parsed at the destination computer located at the destination network address by the destination application in order that the relevant data values or program code are extracted and used by the destination application.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, a relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. In some embodiments, data stored in memory may be stored in the memory device, or an external mass data storage device like a disk drive. In yet other embodiments, the CPU may be running an operating system where storing a data set in memory is performed virtually, such that the data resides partially in a memory device and partially on the mass storage device. The CPU may perform logic comparisons of one or more of the data items stored in memory or in the cache memory of the CPU, or perform arithmetic operations on the data in order to make selections or determinations using such logical tests or arithmetic operations. The process flow may be altered as a result of such logical tests or arithmetic operations so as to select or determine the next step of a process. For example, the CPU may obtain two data values from memory and the logic in the CPU determine whether they are the same or not. Based on such Boolean logic result, the CPU then selects a first or a second location in memory as the location of the next step in the program execution. This type of program control flow may be used to program the CPU to determine data, or select a data from a set of data. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades or brightness. The user interface may also display a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a two dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), any form of 802.11.xx or Bluetooth.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Javascript, C, C++, JAVA, or HTML or scripting languages that are executed by Internet web-browsers) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, binary components that, when executed by the CPU, perform particular tasks or implement particular abstract data types and when running, may generate in computer memory or store on disk, various data structures. A data structure may be represented in the disclosure as a manner of organizing data, but is implemented by storing data values in computer memory in an organized way. Data structures may be comprised of nodes, each of which may be comprised of one or more elements, encoded into computer memory locations into which is stored one or more corresponding data values that are related to an item being represented by the node in the data structure. The collection of nodes may be organized in various ways, including by having one node in the data structure being comprised of a memory location wherein is stored the memory address value or other reference, or pointer, to another node in the same data structure. By means of the pointers, the relationship by and among the nodes in the data structure may be organized in a variety of topologies or forms, including, without limitation, lists, linked lists, trees and more generally, graphs. The relationship between nodes may be denoted in the specification by a line or arrow from a designated item or node to another designated item or node. A data structure may be stored on a mass storage device in the form of data records comprising a database, or as a flat, parsable file. The processes may load the flat file, parse it, and as a result of parsing the file, construct the respective data structure in memory. In other embodiment, the data structure is one or more relational tables stored on the mass storage device and organized as a relational database.

The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card, SD Card), or other memory device, for example a USB key. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., a disk in the form of shrink wrapped software product or a magnetic tape), preloaded with a computer system (e.g., on system ROM or fixed disk), or distributed from a server, website or electronic bulletin board or other communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention. Where the disclosure refers to matching or comparisons of numbers, values, or their calculation, these may be implemented by program logic by storing the data values in computer memory and the program logic fetching the stored data values in order to process them in the CPU in accordance with the specified logical process so as to execute the matching, comparison or calculation and storing the result back into computer memory or otherwise branching into another part of the program logic in dependence on such logical process result. The locations of the stored data or values may be organized in the form of a data structure.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A method executed by a computer system comprised of at least one central processing unit for managing a project represented by a workflow data structure stored in the computer system, the method comprising:

storing in data memory a workflow data structure, said workflow data structure comprised of data representing an at least two workflow elements, each at least two workflow elements comprised of at least one relationship identifier, said at least two workflow elements each further comprised of an at least one decision workflow element;

storing in data memory a workflow element relationships table that defines at least one dependency between at least two of the at least two workflow elements, said dependencies further expressing dependencies between at least two of the decision workflow elements corresponding to the at least two workflow elements;

receiving data representing an at least one input to at least one of the decision workflow elements corresponding to the at least two workflow elements;

in response to receiving the data representing at least one input, automatically executing by the at least one central processing unit a process to select a first of the at least two workflow elements wherein the at least one central processing unit traverses the workflow element relationships table to locate a first corresponding decision workflow element;

automatically executing by the at least one central processing unit a process corresponding to the selected first decision workflow element using the received data as input data;

automatically executing by the at least one central processing unit a process to update a data comprising the first selected workflow element data structures in dependence on an output of the selected first decision workflow element process;

automatically executing by the at least one central processing unit a process to select a second of the at least two workflow element data structures by using the updated data comprising the first at least one workflow element data structure to make the selection of the second of the at least one workflow element data structures; and automatically executing by the at least one central processing unit a process corresponding to a second of the corresponding workflow decision elements using the updated data comprising the first selected at least one work flow element data structure.

2. The method of claim 1 further comprising:
receiving data representing a user identity;
automatically generating a validation value corresponding to the received user identity data by comparing the received user identity data to a user identity data stored in the first decision element data structure; and
performing the update a data step in dependence on the generated validation value.

3. The method of claim 2 further comprising:
retrieving a script comprising the first selected decision workflow element and executing the retrieved script.

4. The method of claim 2 further comprising
determining, a data destination representing a corresponding designated user; and
transmitting a data message to the determined data destination, said data message comprised of an at least one data value comprising the first selected workflow element data structure.

5. The method of claim 4 where the designated user corresponds to the user identity data stored in the first decision element data structure.

6. The method of claim 4 further comprising:
determining a logical condition of the system not having received a data message of a predetermined message type from a user of a predetermined user type designated by the first workflow element data structure;

storing a data value representing the condition that the data message has not been received; and automatically executing by the at least one central processing unit a process to traverse the workflow elements relationship table comprising the project to automatically determine which of the at least two workflow element data structures have the determined logical condition.

7. The method of claim 6 further comprising:

determining for each of the determined workflow element data structures a user identity if the user of a predetermined type; and determining for each determined user identity the number of corresponding cases where the data messages has not been received.

8. The method of claim 2 where the first workflow element data structure is comprised of data representing a time value corresponding to a time that the first workflow element data structure entered a latest state condition.

9. The method of claim 8 where the first workflow element data structure is comprised of data representing a calculated time interval data.

10. The method of claim 2 further comprising:

determining a current time value; and calculating a time interval data value between the time that the first workflow element data structure entered its latest state condition and the determined current time.

11. The method of claim 1 further comprising:

determining a logical condition that the received data is not comprised of a data of a predetermined data type and performing the update a data step in dependence on said determined logical condition.

12. The method of claim 1 where the received data corresponds to a status value comprising the selected first workflow element data structure and the status value is initially set to a null value and the updated value is data representing either a True or a False value.

13. A computer system comprised of at least one central processing unit for managing a project represented by a workflow data structure stored in a storage device comprising the computer system, the data storage device further comprising program data that when executed by the at least one central processing unit causes the computer system to:

store in data memory a workflow data structure, said workflow data structure comprised of data representing an at least two workflow elements, each of the at least two workflow elements comprised of at least one relationship identifier said at least two workflow elements comprised of an at least one decision workflow element;

store in data memory a workflow element relationships table that defines at least one dependency between at least two of the at least two workflow elements, said dependencies further comprising dependencies on the corresponding at least two decision element data structures comprising the at least two workflow elements;

receive data representing an at least one input to at least one of the at least two decision elements;

in response to receiving the data representing at least one input, automatically executing by the at least one central processing unit a process to select a first of the at least two workflow elements wherein the at least one central processing unit traverses the workflow relationship table to locate a first decision element corresponding to the received data;

automatically executing by the at least one central processing unit a process to update a data comprising the first selected workflow element data structure in dependence on an output of the located decision workflow element process; and automatically executing by the at least one central processing unit a process to select a second of the at least two workflow element data structures by using the updated data comprising the first workflow element data structure.

14. The system of claim 13 where the program data when executed by the at least one central processing unit further causes the computer system to:

receive data representing a user identity;

automatically generate a validation value corresponding to the received user identity data by comparing the received user identity data to a user identity data stored in the located first decision element data structure; and selecting whether to perform or not perform the process to update a data step in dependence on the generated validation value.

15. The system of claim 14 where the program data when executed further causes the computer system to:

retrieve a script comprising the located first decision workflow element and executing the retrieved script.

16. The system of claim 15 where the program data when executed by the central processing unit further causes the computer system to:

determine a logical condition of the system not having received a data message of a predetermined message type from a user of a predetermined user type designated by the selected first workflow data structure;

store a data value representing the condition that the data message has not been received; and automatically executing by the at least one central processing unit a process to traverse the workflow elements relationship table comprising the project to automatically determine which of the at least one two workflow element data structures have the determined logical condition.

17. The system of claim 16 where the program data when executed by the central processing unit further causes the computer system to determine for each of the determined workflow element data structures a user identity if the user of a predetermined type; and determine for each determined user identity the number of corresponding cases where the data messages has not been received.

18. The system of claim 14 where the program data when executed further causes the computer system to:

determine a data destination representing a corresponding designated user automatically extracted from the selected first workflow element data structure; and transmit a data message to the determined data destination, said data message comprised of an at least one data value comprising the selected first workflow element data structure.

19. The system of claim 18 where the designated user corresponds to the user identity data stored in the decision element data structure corresponding to the selected first workflow element data structure.

20. The system of claim 14 where the program data when executed by the central processing unit further causes the computer system to:

determine a logical condition that the received data is not comprised of a data of a predetermined data type and in dependence on said determining, automatically preventing the updating step.

21. The system of claim 14 where the first at least one workflow element data structure is comprised of data representing a time value corresponding to a time that the selected first workflow element data structure entered a latest state condition.

22. The system of claim 21 where the selected first workflow element data structure is comprised of data representing the calculated time interval data.

23. The system of claim 14 where the program data when executed further causes the computer system to:
   determine a current time value; and
   calculate a time interval data value between the time that the selected first workflow element data structure entered a latest state condition and the determined current time.

24. The system of claim 13 where the received data corresponds to a status value comprising the selected first workflow element data structure and the status value is initially set to a null value and the updated value is data representing the either a True or a False value.

* * * * *